(12) United States Patent
Kim

(10) Patent No.: US 7,570,308 B2
(45) Date of Patent: Aug. 4, 2009

(54) METHOD FOR COLOR SATURATION ADJUSTMENT IN AN RGB COLOR SYSTEM

(75) Inventor: Yeong-Taeg Kim, Irvine, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 686 days.

(21) Appl. No.: 11/272,158

(22) Filed: Nov. 10, 2005

(65) Prior Publication Data

US 2006/0061692 A1 Mar. 23, 2006

Related U.S. Application Data

(62) Division of application No. 10/230,827, filed on Aug. 29, 2002, now Pat. No. 7,042,521.

(51) Int. Cl.
*H04N 5/54* (2006.01)

(52) U.S. Cl. ................................. 348/645

(58) Field of Classification Search .......... 348/645, 348/649, 650, 646, 661, 663, 659; 382/167; 358/1.9
See application file for complete search history.

(56) References Cited

U.S. PATENT DOCUMENTS

| | | | | |
|---|---|---|---|---|
| 4,812,902 A | * | 3/1989 | Fuchsberger | ............... 358/521 |
| 4,812,903 A | * | 3/1989 | Wagensonner et al. | ...... 358/521 |
| 5,081,529 A | * | 1/1992 | Collette | ................. 358/504 |
| 5,317,678 A | | 5/1994 | Okawara et al. | ............ 345/426 |
| 5,619,280 A | | 4/1997 | Yamashita et al. | ............. 348/645 |
| 5,691,779 A | * | 11/1997 | Yamashita et al. | ............. 348/645 |
| 6,025,885 A | * | 2/2000 | Deter | ............................. 348/661 |
| 6,188,788 B1 | * | 2/2001 | Renner et al. | ................ 382/167 |
| 6,724,934 B1 | | 4/2004 | Lee et al. | ....................... 382/167 |
| 6,868,179 B2 | * | 3/2005 | Gruzdev et al. | .............. 382/167 |
| 6,876,764 B2 | | 4/2005 | Lee et al. | ....................... 382/162 |
| 7,042,521 B2 | * | 5/2006 | Kim | .............................. 348/645 |
| 2002/0141640 A1 | | 10/2002 | Kraft | ............................ 382/167 |
| 2002/0145610 A1 | | 10/2002 | Barilovits et al. | ............ 345/538 |

FOREIGN PATENT DOCUMENTS

JP 2004054250 A 2/2004

* cited by examiner

*Primary Examiner*—Paulos M Natnael
(74) *Attorney, Agent, or Firm*—Kenneth L. Sherman, Esq.; Michael Zarrabian, Esq.; Myers Andras Sherman LLP

(57) ABSTRACT

The present invention relates to a method for adjusting the saturation levels of the pixels of a time varying image being represented by RGB color sample vectors $\vec{C}$ in an RGB color system. The method does not require the RGB color sample vectors $\vec{C}$ to be converted into YUV samples in order to subsequently perform saturation adjustment. The method includes steps of: decomposing an RGB color sample vector $\vec{C}$ into a white vector $\vec{w}$ and a color tone vector $\vec{C}_T$; obtaining a saturation adjusted color tone vector $C_T^o$ by multiplying the color tone vector $\vec{C}_T$ by a saturation adjustment parameter; obtaining a saturation adjusted RGB color sample vector $\vec{C}_o$ by adding the white vector $\vec{w}$ and the saturation adjusted color tone vector $C_T^o$; and using the saturation adjusted RGB color sample vector $\vec{C}_o$ to represent a color pixel of an output image.

23 Claims, 9 Drawing Sheets

FIG. 1

Prior Art

FIG. 2

Prior Art

METHOD FOR COLOR SATURATION ADJUSTMENT IN AN RGB COLOR SYSTEM

This application is a Divisional Patent Application of U.S. patent application Ser. No. 10/230,827, filed Aug. 29, 2002.

BACKGROUND OF THE INVENTION

Field of the Invention

The present invention relates to a method for adjusting the saturation levels of the pixels of a time varying image being represented using RGB signals in an RGB color system. The method does not require the RGB signals to be converted into YUV signals in order to subsequently perform saturation adjustment. Hence, the associated H/W complexity required to perform the inventive method is low when compared to that required to perform the typical saturation level adjusting method.

The luminance and chromatic component Y, U, V color system, also known as the luminance and color difference color system (Y, R–Y,B–Y) is the color system that is most widely used in video systems. For example, in a digital TV system, the Y, U, and V signals of a video are compressed and transmitted. In such a system, since the color information is embedded in the chroma signals U and V, the color saturation level is simply adjusted by multiplying the chroma signals U and V by a color saturation adjusting gain a as expressed by the following equations:

$$U_o = \alpha \cdot U \text{ and } V_o = \alpha \cdot V.$$

Figure 1:
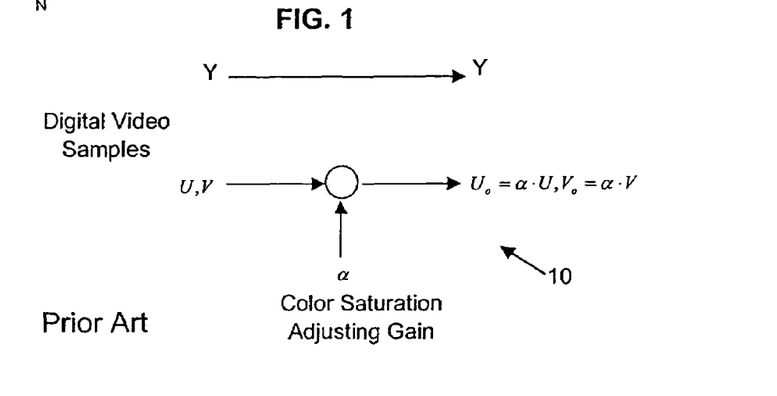
FIG. 1 is a block diagram of a prior art color saturation adjusting circuit.

$U_o$ and $V_o$ now represent color adjusted chroma signals. FIG. 1 is a block diagram of a prior art color saturation adjusting circuit 10 that can be used to multiply the sample values of the chroma signals U and V by the color saturation adjusting gain $\alpha$. Note that if the color saturation adjusting gain $\alpha=0$, the resulting sample value will have no color. If the color saturation adjusting gain $\alpha>1$, then the color of the resulting sample value will be enriched.

Figure 2:
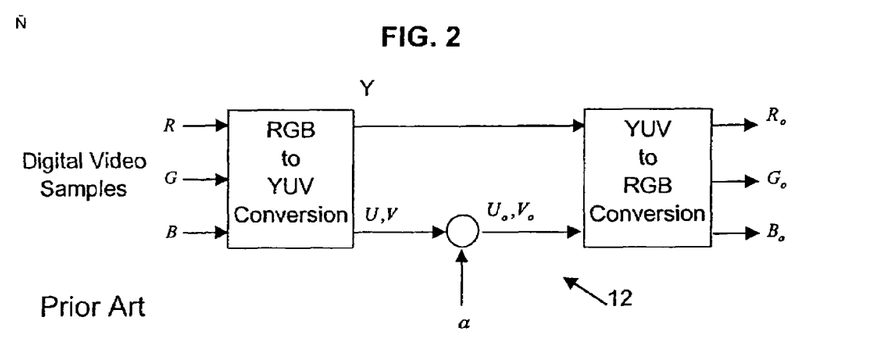
FIG. 2 is a block diagram of a prior art color saturation adjusting circuit that is used in an RGB color system.

In a prior art RGB color system, color saturation adjustment is performed using the color saturation adjustment circuit 12 shown in FIG. 2. Each RGB input sample vector is converted to a YUV sample value, and the color saturation adjusting method shown in FIG. 1 is performed on each YUV sample value. The output color saturation adjusted RGB sample vectors are then obtained by converting the $Y_O$, $U_O$, V color sample values to RGB color sample vectors. As can be seen, considerable computation is required for the conversions.

SUMMARY OF THE INVENTION

It is accordingly an object of the invention to provide a method for color saturation adjustment in an RGB color system which does not require the RGB color sample vectors to be converted into luminance and chroma samples in order to adjust the saturation levels of the RGB color sample vectors.

With the foregoing and other objects in view there is provided, in accordance with the invention, a method for adjusting a color saturation level of at least one color pixel of an input image obtained from a time varying RGB video signal. The method includes steps of: obtaining an RGB color sample vector $\vec{C}$ representing the color pixel of the input image obtained from the time varying RGB video signal; decomposing the RGB color sample vector $\vec{C}$ into a white vector $\vec{w}$ and a color tone vector $\vec{C}_T$; obtaining a saturation adjusted color tone vector $C_T^o$ by multiplying the color tone vector $\vec{C}_T$ by a saturation adjustment parameter; obtaining a saturation adjusted RGB color sample vector $\vec{C}_o$ by adding the white vector $\vec{w}$ and the saturation adjusted color tone vector $C_T^o$; and using the saturation adjusted RGB color sample vector $\vec{C}_o$ to represent a color pixel of an output image.

In accordance with an added feature of the invention, the saturation adjustment parameter is constructed such that the saturation level of the saturation adjusted color tone vector $C_T^o$ will not exceed a predetermined limit value.

In accordance with an additional feature of the invention, the saturation adjustment parameter is constructed as a color saturation adjusting gain $\alpha$, and it is ensured that when the color saturation adjusting gain $\alpha$ equals zero, the saturation adjusted RGB color sample vector $\vec{C}_o$ becomes a gray value. This is accomplished by performing the following additional steps: a luminance vector $\vec{Y}$ is defined where each component of the luminance vector $\vec{Y}$ is a luminance value obtained from the RGB color sample vector $\vec{C}$; the saturation adjustment parameter is configured to include at least a color saturation adjusting gain $\alpha$; a gray mixing ratio $\alpha_g$ is obtained by selecting a minimum value from the group consisting of one and the color saturation adjusting gain $\alpha$; and a gray level adjusted vector is obtained by multiplying the luminance vector $\vec{Y}$ by a quantity obtained by subtracting the gray mixing ratio $\alpha_g$ from one. In addition, the step of obtaining the saturation adjusted RGB color sample vector $\vec{C}_o$ is performed by: before adding the white vector $\vec{w}$ and the saturation adjusted color tone vector $C_T^o$, multiplying the white vector $\vec{w}$ by the gray mixing ratio $\alpha_g$; and when adding the white vector $\vec{w}$, which has been multiplied by the gray mixing ratio $\alpha_g$, and the saturation adjusted color tone vector $C_T^o$, also adding thereto, the gray level adjusted vector to obtain the saturation adjusted RGB color sample vector $\vec{C}_o$. The color saturation adjusting gain a can be manually obtained from an adjustment by a user of the color system, or can be automatically set by an appropriate circuit.

DESCRIPTION OF THE PREFERRED EMBODIMENTS

The following text uses a single digital RGB color sample vector $\vec{C} = (R,G,B)$ to explain the invention. It should be readily apparent, however, that in a practical application, the inventive method will be applied to a plurality of digital RGB color sample vectors $\vec{C}$ representing the images obtained from the time varying RGB video signals of an RGB color system.

The invention begins with decomposing a given digital RGB color input sample vector $\vec{C} = (R,G,B)$ into two components according to the following equation:

$$\vec{C} = \vec{w} + \vec{C}_T. \qquad (1)$$

Figure 3:
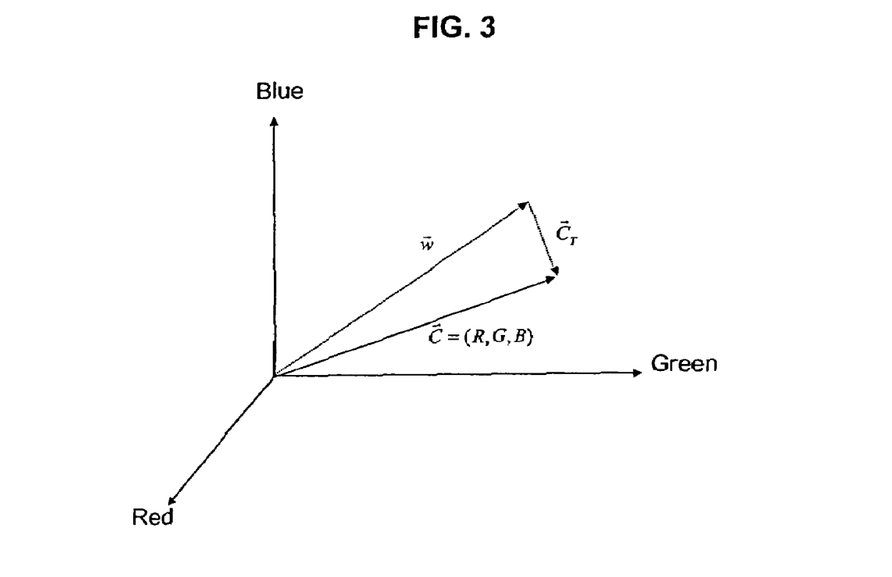
FIG. 3 shows a graphical representation of the decomposition of an RGB color sample vector into a white vector and a color tone vector.

Here, $\vec{w}$ represents a white vector and $\vec{C}_T = (R_T, G_T, B_T)$ represents a color tone vector associated with the color input sample vector. The white vector $\vec{w}$ presumably contains the lightness quantity and the color tone vector $\vec{C}_T = (R_T, G_T, B_T)$ contains the color information. FIG. 3 shows a graphical representation of this decomposition. The range of the color samples is assumed to be $0 \leq R,G,B \leq 255$, however, the invention can be used with color samples having any range. Note that the direction of the color tone vector $\vec{C}_T$ is associated with the "hue", while the magnitude of the color tone vector $\vec{C}_T$ is associated with the "saturation".

A first embodiment of the method for color saturation adjustment is based on applying the following equation:

$$\vec{C}_o = \vec{w} + P \cdot \vec{C}_T = \vec{w} + \vec{C}_T^o. \qquad (2a)$$

Here, P is a saturation adjustment parameter, which when multiplied against the color tone vector $\vec{C}_T$, works to adjust the saturation of the color tone vector $\vec{C}_T$. The vector $P \cdot \vec{C}_T$ represents a saturation adjusted color tone vector $\vec{C}_T^o$. The vector $\vec{C}_o$ is a saturation adjusted RGB color sample vector, which can be output to represent a pixel of an output image.

Subsequently, in this text, four specific examples of methods are provided that can be used to obtain the saturation adjusted color tone vector $\vec{C}_T^o$. These methods differ in the specific form of the saturation adjustment parameter P that is used. The saturation adjustment parameter P can take the form of a color saturation adjusting gain α. This color saturation adjusting gain α can be obtained from the actions of a user of the system or from a circuit constructed to set the color saturation adjusting gain α. The saturation adjustment parameter P can alternatively include two factors, namely a color saturation adjusting gain α and a saturation limiting parameter β, which are multiplied together. In an additional alternative, the saturation adjustment parameter P can be a variable denoted by r. The saturation adjustment parameter P can also take the form of a real color adjusting gain x. The specific forms of the saturation adjustment parameter P will become clear with regard to further explanations provided later on in this text.

An example of the first embodiment of the method for color saturation adjustment will be further explained in a version in which the saturation adjustment parameter P takes the form of a color saturation adjusting gain α, where (α≧0). This example of the first embodiment of the method for color saturation adjustment will then be based on applying the following equation:

$$\vec{C}_o = \vec{w} + \alpha \cdot \vec{C}_T = \vec{w} + \vec{C}_T^o. \qquad (2b)$$

In equation (2b), it can be seen that the saturation adjusted color tone vector $\vec{C}_T^o$ equals $\alpha \cdot \vec{C}_T$. Note that $\vec{C}_o = \vec{w}$ if α=0 (no color), $\vec{C}_o = \vec{C}$ when α=1, and the color saturation level is increased if α>1.

Figure 4:
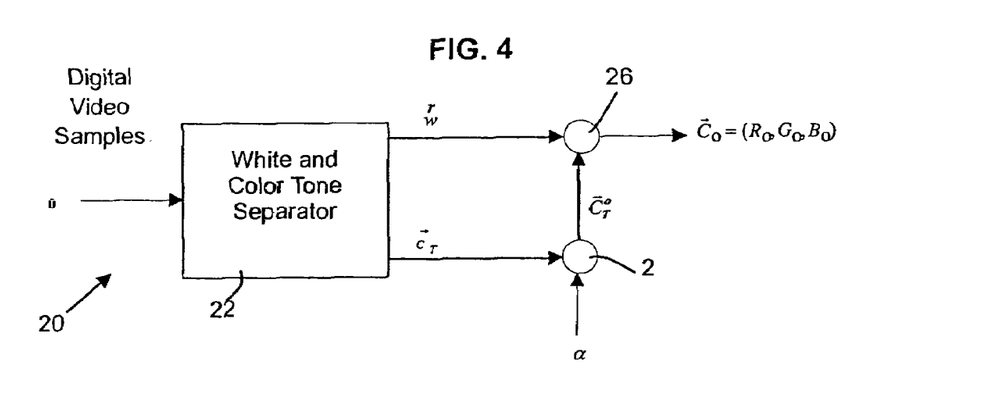
FIG. 4 is a block diagram of a circuit for performing an example of a first embodiment of the method for color saturation adjustment.

FIG. 4 shows a block diagram of a circuit 20 for performing the example of the first embodiment of the method for color saturation adjustment in which the saturation adjustment parameter P takes the form of a color saturation adjusting gain α. The white and color tone separator 22 decomposes the input color vector $\vec{C} = (R,G,B)$ into a white vector $\vec{w}$ and a color tone vector $\vec{C}_T = (R_T, G_T, B_T)$ as described by equation (1). The saturation adjusted color tone vector $\vec{C}_T^o$ is obtained using the multiplier 24, which performs the operation $\vec{C}_T^o = \alpha \cdot \vec{C}_T$. The saturation adjusted RGB color sample vector $\vec{C}_o$ is obtained from the vector summer 26, which adds the white vector $\vec{w}$ and the saturation adjusted color tone vector $\vec{C}_T^o$.

The input color vector $\vec{C} = (R,G,B)$ can be decomposed into a white vector $\vec{w}$ and a color tone vector $\vec{C}_T = (R_T, G_T, B_T)$ using any of a number of different decompositions. Although, the invention is not meant to be limited to any specific decomposition, the decomposition can be performed, for example, by using any of the following decompositions:

$\vec{C}_T = (R-Y, G-Y, B-Y)$ and $\vec{w} = (Y, Y, Y)$, where Y is a luminance value; (3)

$$\vec{C}_T = (R-X, G-X, B-X) \text{ and } \vec{w} = (X, X, X), \qquad (4)$$
$$\text{where } X = \frac{R+G+B}{3}; \text{ and}$$

-continued $$\vec{C}_T = \left(R - \frac{G+B}{2}, G - \frac{R+B}{2}, B - \frac{R+G}{2}\right) \text{ and} \quad (5)$$

$$\vec{w} = \left(\frac{G+B}{2}, \frac{R+B}{2}, \frac{R+G}{2}\right).$$

Figure 5:
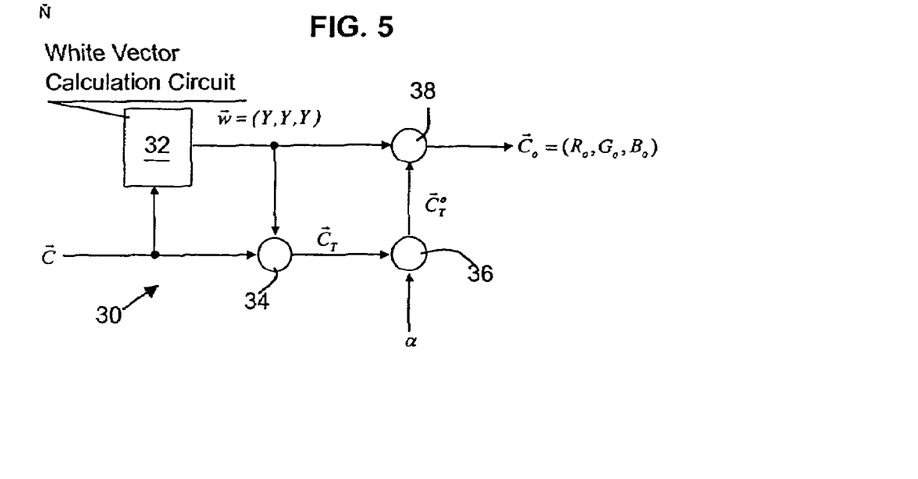
FIG. 5 is a block diagram of a circuit for performing another example of the first embodiment of the method for color saturation adjustment.

FIG. 5 shows a block diagram of a circuit 30 for performing the first embodiment of the method in which the decomposition described in equation (3) is performed. The white vector calculation circuit 32 calculates a luminance value Y from the RGB color sample vector $\vec{C}$ and constructs a white vector $\vec{w}$. Each component of the white vector $\vec{w}$ is equal to the luminance value Y. The vector summer 34 subtracts the white vector $\vec{w}$ from the RGB color sample vector $\vec{C}$ to obtain the color tone vector $\vec{C}_T$. The multiplier 36 multiplies the color tone vector $\vec{C}_T$ by the color saturation adjusting gain a to obtain the saturation adjusted color tone vector $C_T^o$. The vector summer 38 adds the saturation adjusted color tone vector $\vec{C_T^o}$ and the white vector $\vec{w}$ to obtain the saturation adjusted RGB color sample vector $\vec{C}_o$. It is assumed that the color saturation adjusting gain α is equal to or greater than zero.

Turning our attention to the case when the color saturation adjusting gain α=0 in equation (2b), note that the saturation adjusted RGB color sample vector $\vec{C}_o$ may not be a gray value depending on the choice of the color tone vector $\vec{C}_T$ or equivalently on the choice of the white vector $\vec{w}$. For instance, if we choose to use equation (3) for the decomposition, the saturation adjusted RGB color sample vector $\vec{C}_o$ will be (Y,Y,Y) when the color saturation adjusting gain α=0. This implies that the saturation adjusted RGB color sample vector $\vec{C}_o$ is a gray value. However, if we choose to use equation (4) for the decomposition, the saturation adjusted RGB color sample vector $\vec{C}_o$ will be (X,X,X) when α=0. In this case, the saturation adjusted RGB color sample vector $\vec{C}_o$ becomes a gray value, but it is somewhat different from the typical gray value denoted as Y. Furthermore, if we choose to use equation (4) for the decomposition, the saturation adjusted RGB color sample vector $\vec{C}_o$ will be $$\left(\frac{G+B}{2}, \frac{R+B}{2}, \frac{R+G}{2}\right)$$

when α=0, which is not a gray value, in general. In most cases, it is desirable to ensure that the saturation adjusted RGB color sample vector $\vec{C}_o$ becomes a gray value whose gradation level is associated with the luminance value of the input signal $\vec{C}$=(R,G,B) when α=0. For this purpose, a gray mixing ratio is defined as:

$$\alpha_g = \min(1.0, \alpha).$$

A second embodiment of the method for color saturation adjustment is based on applying the following equation:

$$\vec{C}_o = \vec{Y} \cdot (1-\alpha_g) + \vec{w} \cdot \alpha_g + P \cdot \vec{C}_T; \text{ or}$$

$$\vec{C}_o = \vec{Y} \cdot (1-\alpha_g) + \vec{w} \cdot \alpha_g + \vec{C_T^o}; \text{ where } \vec{Y} = (Y,Y,Y). \quad (6a)$$

As with the first embodiment, P is the saturation adjustment parameter and $C_T^o$ is a saturation adjusted color tone vector. It should be clear that the second embodiment of the method for color saturation adjustment is equivalent to the first embodiment except for the fact that additional steps are performed. In particular, the gray mixing ratio $\alpha_g$ is multiplied with the white vector $\vec{w}$ before the summation is performed, and the term $\vec{Y} \cdot (1-\alpha_g)$ is included in the summation. The term $\vec{Y} \cdot (1-\alpha_g)$ is defined as a gray level adjusted vector.

An example of the second embodiment of the method for color saturation adjustment will be further explained in a version in which the saturation adjustment parameter P takes the form of a color saturation adjusting gain α, where (α≧0). This example of the second embodiment of the method for color saturation adjustment will then be based on applying the following equation:

$$\vec{C}_o = \vec{Y} \cdot (1-\alpha_g) + \vec{w} \cdot \alpha_g + \alpha \cdot \vec{C}_T; \text{ where } \vec{Y} = (Y,Y,Y). \quad (6b)$$

The saturation adjusted RGB color sample vector $\vec{C}_o$ approaches (Y,Y,Y) as α approaches 0. Therefore, the saturation adjusted RGB color sample vector $\vec{C}_o$ becomes a gray value whose gradation level is Y. Note that the saturation adjusted RGB color sample vector $\vec{C}_o$ in equation (6b) is equivalent to that in equation (2b) when α≧1.

Figure 6:
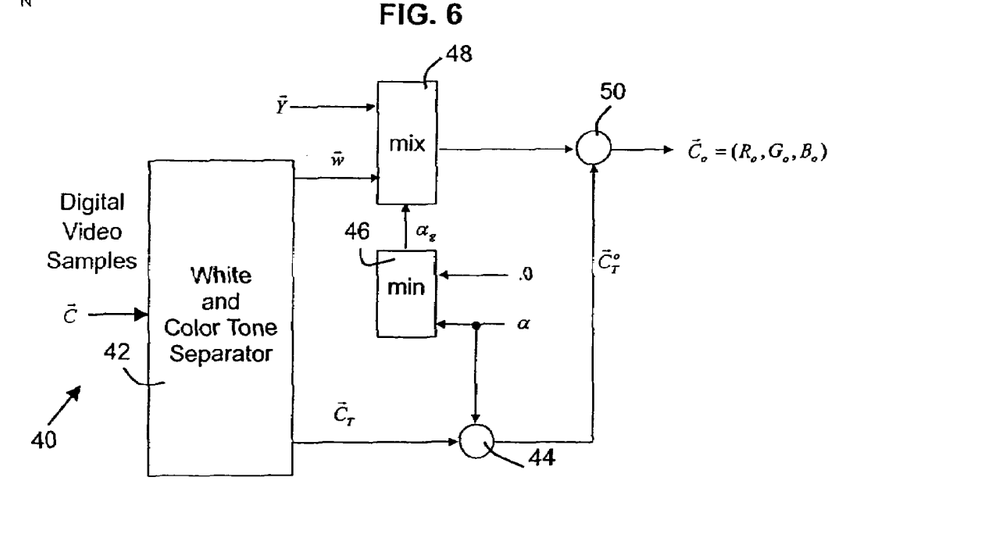
FIG. 6 is a block diagram of a circuit for performing an example of a second embodiment of the method for color saturation adjustment.

FIG. 6 shows a block diagram of a circuit 40 for performing this example of the second embodiment of the method for color saturation adjustment. The white and color tone separator 42 decomposes the input color vector $\vec{C}$=(R,G,B) into a white vector $\vec{w}$ and a color tone vector $\vec{C}_T$=(R_T,G_T,B_T) as described by equation (1). The saturation adjusted color tone vector $C_T^o$ is obtained using the multiplier 44, which performs the operation $\vec{C}_T^o = \alpha \cdot \vec{C}_T$. The minimum value selection circuit 46 obtains the minimum value selected from one and the color saturation adjusting gain α, and provides the result as the gray mixing ratio $\alpha_g$. The output signal of the mixer 48 is $\vec{Y} \cdot (1-\alpha_g) + \vec{w} \cdot \alpha_g$. The saturation adjusted RGB color sample vector $\vec{C}_o$ is obtained from the adder 50, which adds the saturation adjusted color tone vector $C_T^o$ and the term $\vec{Y} \cdot (1-\alpha_g) + \vec{w} \cdot \alpha_g$ obtained from the mixer 48.

Figure 7:
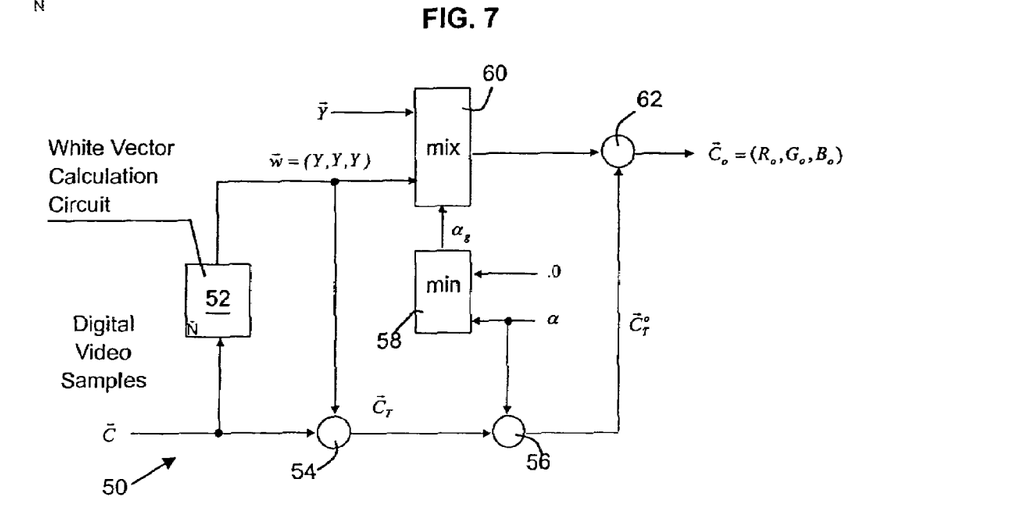
FIG. 7 is a block diagram of a circuit for performing another example of the second embodiment of the method for color saturation adjustment.

FIG. 7 shows a block diagram of a particular implementation of the circuit 50 for performing the second embodiment of the method for color saturation adjustment. The circuit 50 implements equation (3) to perform the decomposition. The white vector calculation circuit 52 calculates a luminance value Y from the RGB color sample vector $\vec{C}$ and constructs a white vector $\vec{w}$. Each component of the white vector $\vec{w}$ is equal to the luminance value Y. The vector summer 54 subtracts the white vector $\vec{w}$ from the RGB color sample vector $\vec{C}$ to obtain the color tone vector $\vec{C}_T$. The multiplier 56 multiplies the color tone vector $\vec{C}_T$ by the color saturation adjusting gain α to obtain the saturation adjusted color tone vector $\vec{C}_T^o$. The minimum value selection circuit 58 chooses a minimum value from one and the color saturation adjusting gain α, and provides the result as the gray mixing ratio $α_g$. The output signal of the mixer 60 is $\vec{Y} \cdot (1-α_g) + \vec{w} \cdot α_g$. The saturation adjusted RGB color sample vector $\vec{C}_o$ is obtained from the adder 62, which adds the saturation adjusted color tone vector $\vec{C}_T^o$ and the term $\vec{Y} \cdot (1-α_g) + \vec{w} \cdot α_g$ that is obtained from the mixer 60.

One common drawback of the first and second embodiments of the method for color saturation adjustment is that a color can be saturated. That is, depending on the degree of the color saturation level of the input sample and the requested value of the color saturation adjusting gain α, the resulting saturation adjusted RGB color vector $\vec{C}_o = (R_o, G_o, B_o)$ can be mapped to outside the color gamut of the R,G,B signals (i.e., R>255, G>255, and/or B>255). In other words, the saturation adjusted RGB color vector $\vec{C}_T^o = α \cdot \vec{C}_T$ can be saturated depending on the saturation level of $\vec{C}_T$ and α. Hence, an optionally provided feature of the invention is the development of color saturation limiting functions that can be incorporated into the method for color saturation adjustment in an RGB color system.

We will calculate the magnitude of the color tone vector $\vec{C}_T$ and associate this magnitude with the saturation level of the color tone vector $\vec{C}_T$. Remember that the color tone vector $\vec{C}_T$ has the components $(R_T, G_T, B_T)$. We can calculate the magnitude, which we have associated with the saturation level of the color tone vector $\vec{C}_T$, using the following equation:

$$S(\vec{C}_T) = \sqrt{R_T^2 + G_T^2 + B_T^2}. \tag{7}$$

We can alternatively approximate the saturation level using the following equation:

$$S(\vec{C}_T) = |R_T| + |G_T| + |B_T|. \tag{8a}$$

Depending upon the application, various different forms of calculating the saturation level can be defined and the invention should not be limited to any one particular way of calculating this saturation level. For example, some additional ways of calculating the saturation level include:

$$S(\vec{C}_T) = \max(R_T^2, G_T^2, B_T^2); \tag{8b}$$

$$S(\vec{C}_T) = \max(|R_T|, |G_T|, |B_T|); \tag{8c}$$

$$S(\vec{C}_T) = \sqrt{(R_T^2 + G_T^2 + B_T^2) + (R_T - G_T)^2 + (G_T - B_T)^2 + (B_T - R_T)^2}; \tag{8d}$$

and $$S(\vec{C}_T) = |R_T| + |G_T| + |B_T| + |R_T - G_T| + |G_T - B_T| + |B_T - R_T|. \tag{8e}$$

Thus far, we have disclosed, two embodiments of the method for color saturation adjustment. Examples have been given in equations (3)-(5) of how to decompose the digital RGB color input sample vector $\vec{C} = (R,G,B)$ into a white vector $\vec{w}$ and a color tone vector $\vec{C}_T$, however, the invention should not be construed as being limited to these examples of the decomposition. Examples have been given in equations (7) and (8a)-(8e) of how to calculate the saturation level of the color tone vector $\vec{C}_T$, however, as already discussed, the invention should not be construed as being limited to these examples of calculating the saturation level.

In the following text, four embodiments of a method for calculating the saturation adjusted color tone vector $\vec{C}_T^o$ will be disclosed. These embodiments of the method for calculating the saturation adjusted color tone vector $\vec{C}_T^o$ use different forms of the saturation adjustment parameter P. Any one of these embodiments for calculating the saturation adjusted color tone vector $\vec{C}_T^o$ can be used together with the first and second embodiments of the method for color saturation adjustment.

The first embodiment of the method of calculating the saturation adjusted color tone vector $\vec{C}_T^o$ includes developing a saturation limiting parameter β that will be multiplied together with $α \cdot \vec{C}_T$ in order to limit the saturation level to a certain level. That is, the saturation adjusted color tone vector $\vec{C}_T^o$ is given as:

$$\vec{C}_T^o = β \cdot α \cdot \vec{C}_T. \tag{9}$$

Figure 8:
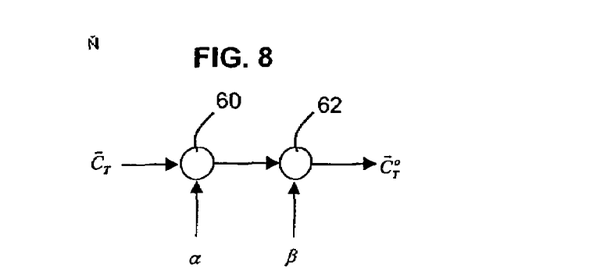
FIG. 8 is a block diagram of two multipliers.

FIG. 8 shows two multipliers 60 and 62 connected to perform the operation described in equation (9). Accordingly, when using the first embodiment of the method for calculating the saturation adjusted color tone vector $\vec{C}_T^o$ in conjunction with the first embodiment of the method for color saturation adjustment as expressed in equation (2a), we define the saturation adjustment parameter P as being β·α. Similarly, when using the first embodiment of the method for calculating the saturation adjusted color tone vector $\vec{C}_T^o$ in conjunction with the second embodiment of the method for color saturation adjustment as expressed in equation (6a), we define the saturation adjustment parameter P as being β·α.

Now the question is how to formulate the saturation limiting parameter β. Note that the purpose of multiplying the saturation limiting parameter β with $α \cdot \vec{C}_T$ as expressed in equation (9) is to prevent the saturation level of $α \cdot \vec{C}_T$ from exceeding a certain saturation level.

If the saturation level $S(α \cdot \vec{C}_T)$ is less than a certain level, which implies that $α \cdot \vec{C}_T$ is "not saturated", then it is obvious from the purpose of introducing the saturation limiting parameter β that β should be equal to one. Hence, it can be stated that:

$$β = 1 \text{ if } S(α \cdot \vec{C}_T) \leq L, \tag{10}$$

where L denotes a pre-determined saturation level to which we want to limit the color saturation level of the adjusted color samples. Hereinafter, L will be referred to as a predetermined limit value. It can be stated that:

$$\vec{C}_T^o = α \cdot \vec{C}_T, \tag{11}$$

when $S(α \cdot \vec{C}_T) \leq L$.

Now in the case when $S(α \cdot \vec{C}_T) > L$, we need to multiply $α \cdot \vec{C}_T$ and the saturation limiting parameter β together so that the color saturation level of the resulting saturation adjusted color tone vector $\vec{C}_T^o$ can be adjusted as a factor of β in order to prevent a possible saturation. The following constraint is imposed:

$$S(\vec{C}_T^o) = L.$$

From the definition given in (7) or (8a), for example, it is noted that:

$$S(\vec{C}_T^o) = S(\beta \cdot \alpha \vec{C}_T) = \beta \cdot S(\alpha \cdot \vec{C}_T).$$

We then obtain the following saturation limiting parameter:

$$\beta = \frac{L}{S(\alpha \cdot \vec{C}_T)}. \quad (12)$$

In summary, the saturation adjustment parameter P is chosen to be the color saturation adjusting gain α multiplied by the saturation limiting parameter β. The saturation adjusted color tone vector $C_T^o$ is then calculated according to the following equation:

$$\vec{C}_T^o = \beta \cdot \alpha \cdot \vec{C}_T, \quad (13)$$

where $$\beta = \begin{cases} 1 & \text{if } S(\alpha \cdot \vec{C}_T) \leq L \\ \dfrac{L}{S(\alpha \cdot \vec{C}_T)} & \text{else} \end{cases} \quad (14)$$

Figure 9:
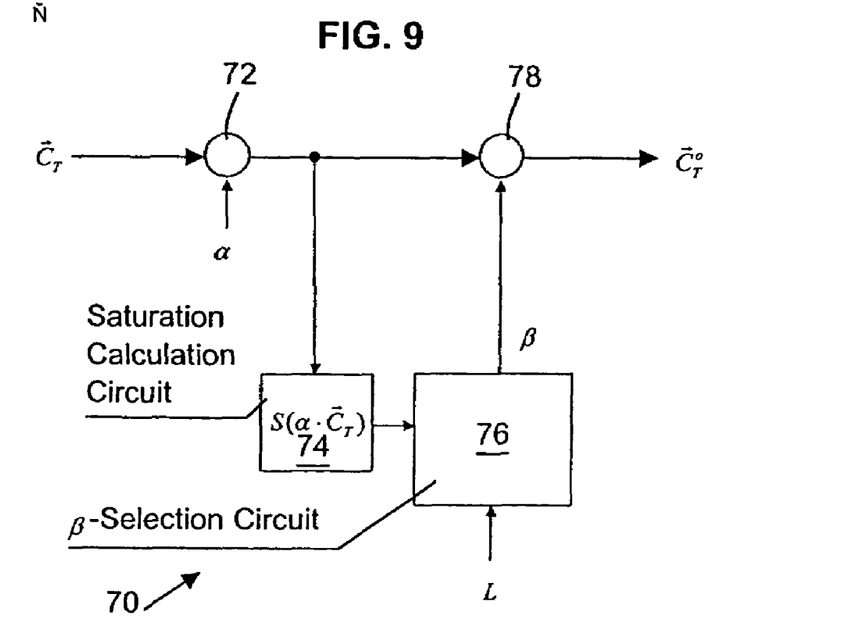
FIG. 9 is a block diagram of a circuit for performing a first embodiment of a method of calculating a saturation adjusted color tone vector $\vec{C}_T^o$.

FIG. 9 shows a block diagram of a circuit 70 for performing the first embodiment of the method of calculating the saturation adjusted color tone vector $C_T^o$. The multiplier 72 multiplies the color tone vector $\vec{C}_T$ by the color saturation adjusting gain α. The saturation calculation circuit 74 calculates the saturation level $S(\alpha \cdot \vec{C}_T)$ and the β-selection circuit 76 chooses the value of the saturation limiting parameter β in accordance with equation (14). The saturation adjusted color tone vector $C_T^o$ is obtained from the multiplier 78, which multiplies β and $\alpha \cdot \vec{C}_T$.

A second embodiment of the method for calculating the saturation adjusted color tone vector $C_T^o$ will now be developed. If we note that $S(\alpha \cdot \vec{C}_T) = \alpha \cdot S(\vec{C}_T)$ and combine it with equations (13) and (14), we obtain:

$$\vec{C}_T^o = r \cdot \vec{C}_T \quad (15)$$

where:

$$r = \begin{cases} \alpha & \text{if } S(\vec{C}_T) \leq \dfrac{L}{\alpha} \\ \dfrac{L}{S(\vec{C}_T)} & \text{else} \end{cases} \quad (16)$$

The result obtained when using equations (15) and (16) to calculate the saturation adjusted color tone vector $C_T^o$ is equivalent to the result obtained when using equations (13) and (14). Note, however, when equations (15) and (16) are used to calculate the saturation adjusted color tone vector $C_T^o$, less computation is required than when using equations (13) and (14). Accordingly, when using the second embodiment of the method for calculating the saturation adjusted color tone vector $C_T^o$ in conjunction with the first embodiment of the method for color saturation adjustment as expressed in equation (2a), or the second embodiment of the method for color saturation adjustment as expressed in equation (6a), we define the saturation adjustment parameter P as being r.

Figure 10:
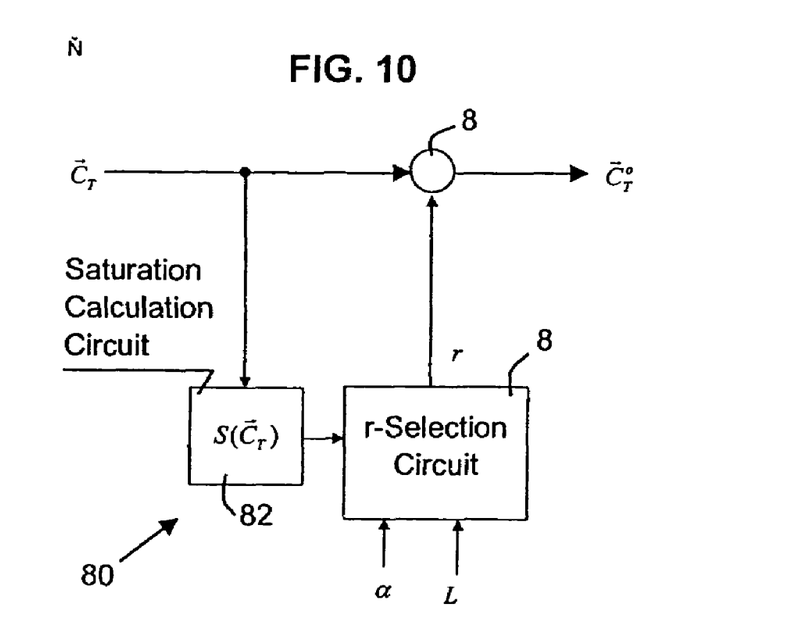
FIG. 10 is a block diagram of a circuit for performing a second embodiment of the method of calculating the saturation adjusted color tone vector $\vec{C}_T^o$.

FIG. 10 shows a block diagram of a circuit 80 for performing the second method of calculating the saturation adjusted color tone vector $C_T^o$. The saturation calculation circuit 82 calculates the saturation level $S(\vec{C}_T)$ and the r-selection circuit 84 chooses the value of r in accordance with equation (16). The saturation adjusted color tone vector $C_T^o$ is obtained from the multiplier 86, which multiplies r and $\vec{C}_T$.

A third embodiment of the method for calculating the saturation adjusted color tone vector $C_T^o$ will now be developed. The saturation adjusted color tone vector $C_T^o$ can be expressed according to the following equation:

$$\vec{C}_T^o = x \cdot \vec{C}_T, \quad (17)$$

where x denotes a real color adjusting gain defined by:

$$x = \begin{cases} \alpha & \text{if } 0 \leq \alpha \leq 1 \\ f(S(\vec{C}_T)) & \text{if } \alpha > 1 \end{cases} \quad (18)$$

The mathematical function $f(S(\vec{C}_T))$ can be any function that satisfies the following conditions:

$f(S(\vec{C}_T))$ is a monotonically decreasing function with respect to $S(\vec{C}_T)$ for $0 \leq S(\vec{C}_T) \leq L$ where L is a predetermined constant limit value;

$f(0) = \alpha$; and $f(S(\vec{C}_T)) = 1$ for $S(\vec{C}_T) \geq L$.

Figure 11:
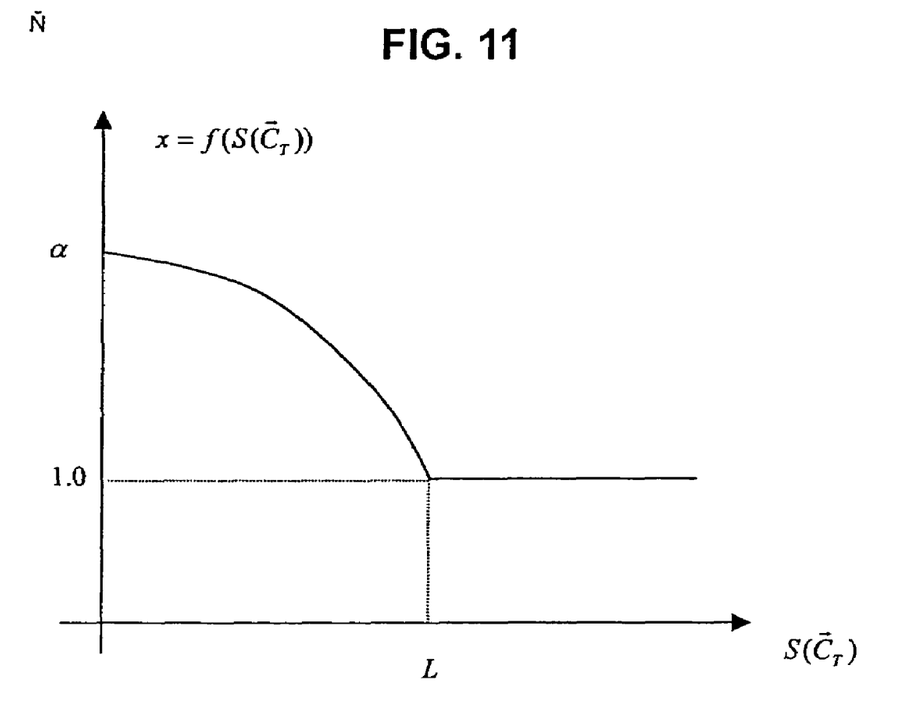
FIGS. 11-13 are graphs of mathematical functions.
Figure 12:
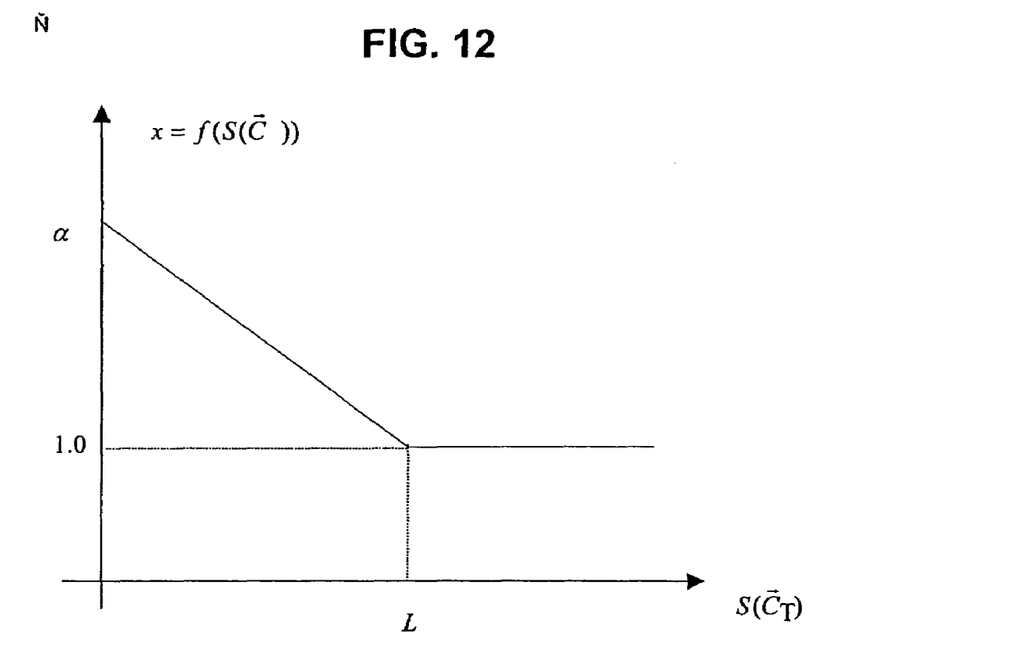
Figure 13:
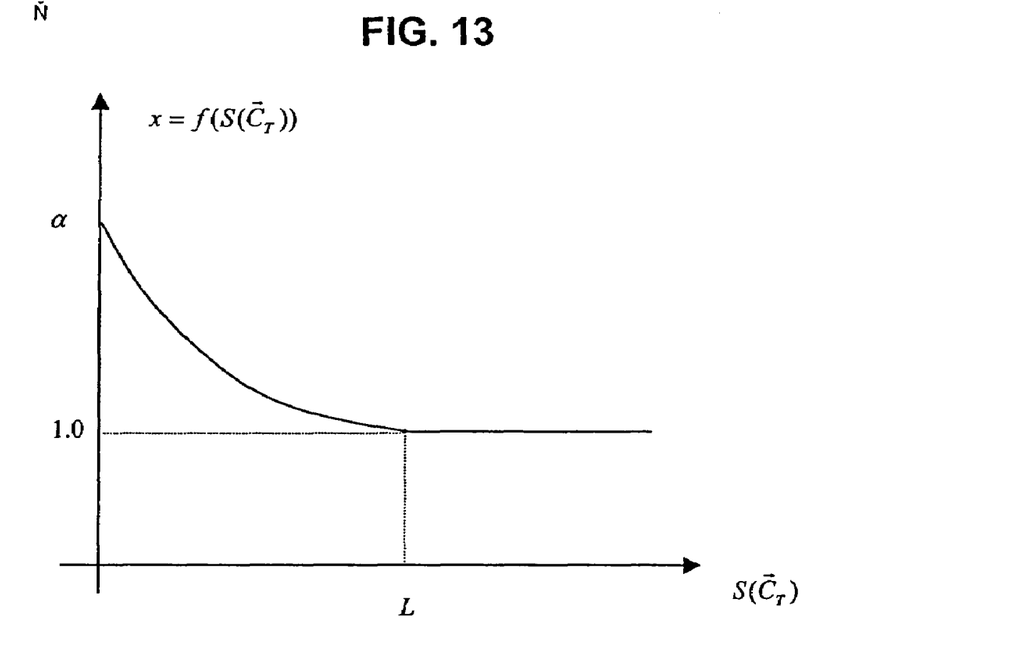

Note that the last condition ensures no change is made in the color saturation level of the input sample when its color saturation level exceeds a certain level even though the color saturation adjusting gain is large (α>1). Examples of $f(S(\vec{C}_T))$ are shown in FIGS. 11, 12, and 13. For instance, in FIG. 11, $x = f(S(\vec{C}_T))$ for $0 \leq S(\vec{C}_T) \leq L$ can be expressed as:

$$x = 1 + (\alpha - 1) \cdot \frac{(L - S(\vec{C}_T)) \cdot (L + S(\vec{C}_T))}{L^2}.$$

Because of the constraints on $f(S(\vec{C}_T))$, when $S(\vec{C}_T) \geq L$, the real color adjusting gain x becomes:

$$x = \begin{cases} \alpha & \text{if } 0 \leq \alpha \leq 1 \\ 1 & \text{if } \alpha > 1 \end{cases}$$

When using the third embodiment of the method for calculating the saturation adjusted color tone vector $C_T^o$ in conjunction with the first embodiment of the method for color saturation adjustment as expressed in equation (2a) or with the second embodiment of the method for color saturation adjustment as expressed in equation (6a), we define the saturation adjustment parameter P as being the real color adjusting gain x.

Figure 14:
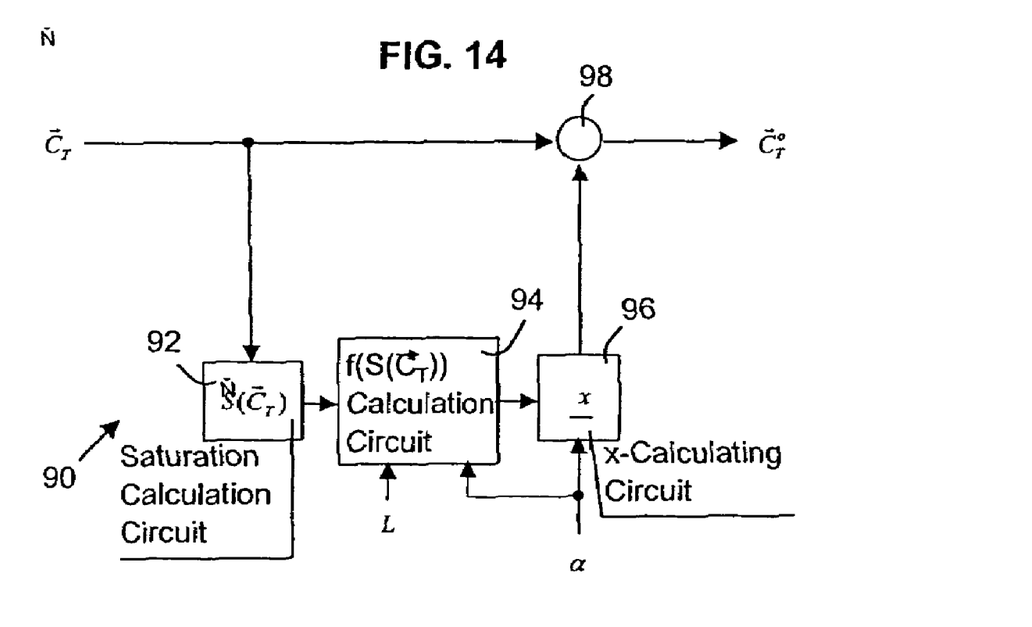
FIG. 14 is a block diagram of a circuit for performing a third embodiment of the method of calculating the saturation adjusted color tone vector $\vec{C}_T^o$.

FIG. 14 shows a block diagram of a circuit 90 for performing the third embodiment of the method for calculating the saturation adjusted color tone vector $C_T^o$. The saturation calculation circuit 92 calculates the saturation level $S(\vec{C}_T)$. The circuit 94 for calculating $f(S(\vec{C}_T))$ evaluates $f(S(\vec{C}_T))$ at the saturation level $S(\vec{C}_T)$. The real color adjusting gain circuit 96 chooses the value of x in accordance with equation (18). The saturation adjusted color tone vector $C_T^o$ is obtained from the multiplier 98, which multiplies x and $\vec{C}_T$.

A fourth embodiment of the method for calculating the saturation adjusted color tone vector $C_T^o$ will now be developed. We will limit the saturation level of the saturation adjusted color tone vector $\vec{C}_T^o = x \cdot \vec{C}_T$ such that:

$$S(\vec{C}_T^o) = x \cdot S(\vec{C}_T) \leq L.$$

When $S(\vec{C}_T) \leq L$ and $\alpha > 1$, the following condition is obtained:

$$x \leq \frac{L}{S(\vec{C}_T)} \quad (19)$$

By combining equations (18) and (19), we obtain the following relationship for the real color adjusting gain:

$$x = \begin{cases} \alpha & \text{if } 0 \leq \alpha \leq 1 \\ \min\left(f(S(\vec{C}_T)), \frac{L}{S(\vec{C}_T)}\right) & \text{if } \alpha > 1 \text{ and } S(\vec{C}_T) \leq L \\ 1 & \text{if } \alpha > 1 \text{ and } S(\vec{C}_T) > L \end{cases} \quad (20)$$

When using the fourth embodiment of the method for calculating the saturation adjusted color tone vector $C_T^o$ in conjunction with the first embodiment of the method for color saturation adjustment as expressed in equation (2a) or with the second embodiment of the method for color saturation adjustment as expressed in equation (6a), we define the saturation adjustment parameter P as being the real color adjusting gain x.

Figure 15:
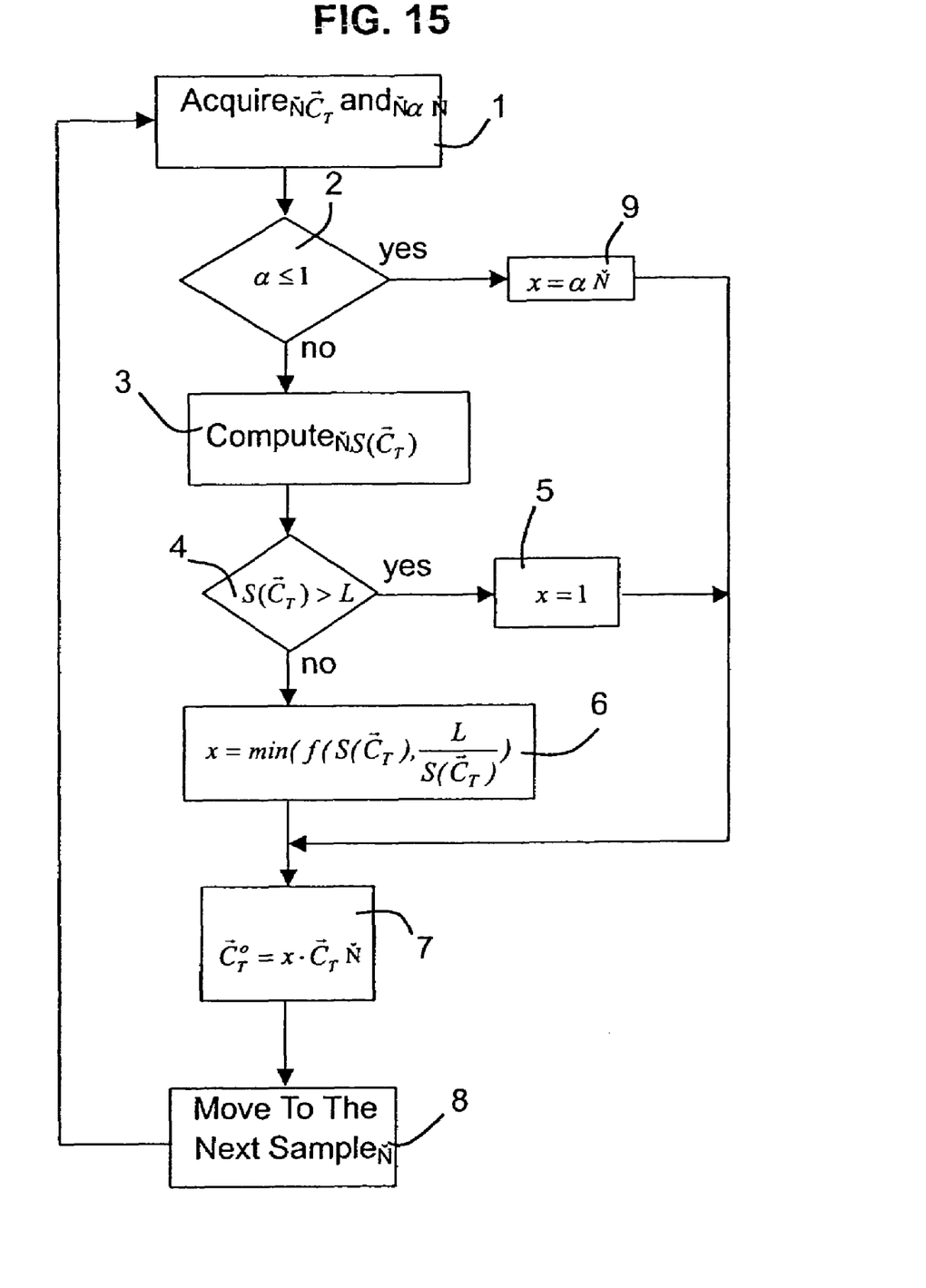
FIG. 15 is a flowchart showing the steps performed in a fourth embodiment of the method of calculating the saturation adjusted color tone vector $\vec{C}_T^o$.

FIG. 15 is a flowchart illustrating the steps used to implement the fourth embodiment of the method for calculating the saturation adjusted color tone vector $C_T^o$ in accordance with equations (17) and (20). In step 1, the color saturation adjusting gain $\alpha$ and the color tone vector $\vec{C}_T$ are acquired. In step 2, it is determined whether the color saturation adjusting gain $\alpha$ is equal to or less than 1. If so, the real color adjusting gain x is set equal to $\alpha$ in step 9. If the color saturation adjusting gain $\alpha$ is not equal to or less than 1, then in step 3, the saturation level of the color tone vector $\vec{C}_T$ is determined. In step 4, it is determined whether the saturation level of the color tone vector $\vec{C}_T$ is greater than the predetermined limit L. If the saturation level of the color tone vector $\vec{C}_T$ is greater than the predetermined limit L, then in step 5, the real color adjusting gain x is set equal to 1. If the saturation level of the color tone vector $\vec{C}_T$ is not greater than the predetermined limit L, then in step 6, a first value is obtained by evaluating the mathematical function $f$ at the value of the saturation level of the color tone vector $\vec{C}_T$, and a second value is obtained by dividing the predetermined limit L by the saturation level of the color tone vector $\vec{C}_T$. Additionally in step 6, a minimum value is selected from the first value and the second value and the real color adjusting gain x is set equal to this minimum value. As can be seen in FIG. 15, step 7 can follow either step 9, 5, or 6. In step 7, a saturation adjusted color tone vector $C_T^o$ is obtained by multiplying the real color adjusting gain x with the color tone vector $\vec{C}_T$. The saturation adjusted color tone vector $C_T^o$ can then be used in equation (2a) to perform the first embodiment of the method for color saturation adjustment, or in equation (6a) to perform the second embodiment. Step 8 causes the procedure to loop back to step 1 to obtain the next color tone vector $\vec{C}_T$, which may represent another pixel of the same input image, or which may possibly represent the first pixel of a subsequent input image.

A circuit for performing the fourth embodiment of the method for calculating the saturation adjusted color tone vector $C_T^o$ can be constructed similarly to the circuit 90 shown in FIG. 14. The difference will be that the real color adjusting gain circuit 96 will choose the value of x in accordance with equation (20).

I claim:

1. A method for adjusting a color saturation level of at least one color pixel of an input image obtained from a time varying RGB video signal, comprising:

employing an RGB color processor for decomposing an RGB color sample representing the at least one color pixel into color tone information including a color tone vector having a direction representative of the hue of the color sample and a magnitude representative of the saturation of the color sample;

determining a saturation adjusted color tone based on the color tone vector and a saturation adjustment parameter; and determining a saturation adjusted RGB color sample based on the saturation adjusted color tone.

2. The method of claim 1, wherein:

the steps of decomposing an RGB color sample further includes the steps of:

obtaining an RGB color sample vector $\vec{C}$ representing the color pixel of the input image obtained from the time varying RGB video signal;

decomposing the RGB color sample vector $\vec{C}$ into a white vector $\vec{w}$ and a color tone vector $\vec{C}_T$;

the steps of determining a saturation adjusted color tone further includes the steps of obtaining a saturation adjusted color tone vector $C_T^O$ by multiplying the color tone vector $\vec{C}_T$ by a saturation adjustment parameter;

the steps of determining a saturation adjusted RGB color sample further includes the steps of obtaining a saturation adjusted RGB color sample vector $\vec{C}_o$ by adding the white vector $\vec{w}$ and the saturation adjusted color tone vector $C_T^O$; and the method further comprising the step of using the saturation adjusted RGB color sample vector $\vec{C}_o$ to represent a color pixel of an output image.

3. The method according to claim 2, which comprises:

defining a luminance vector $\vec{Y}$ where each component of the luminance vector $\vec{Y}$ is a luminance value obtained from the RGB color sample vector $\vec{C}$;

configuring the saturation adjustment parameter to include at least a color saturation adjusting gain $\alpha$;

obtaining a gray mixing ratio $\alpha_g$ by selecting a minimum value from the group consisting of one and the color saturation adjusting gain $\alpha$;

obtaining a gray level adjusted vector by multiplying the luminance vector $\vec{Y}$ by a quantity obtained by subtracting the gray mixing ratio $\alpha_g$ from one; and performing the step of obtaining the saturation adjusted RGB color sample vector $\vec{C}_o$ by:

before adding the white vector $\vec{w}$ and the saturation adjusted color tone vector $C_T^O$, multiplying the white vector $\vec{w}$ by the gray mixing ratio $\alpha_g$, and when adding the white vector $\vec{w}$, which has been multiplied by the gray mixing ratio $\alpha_g$, and the saturation adjusted color tone vector $C_T^O$, also adding thereto, the gray level adjusted vector to obtain the saturation adjusted RGB color sample vector $\vec{C}_o$.

4. The method according to claim 2, which comprises:
acquiring a saturation adjusting gain $\alpha$; and
using the saturation adjusting gain $\alpha$ as the saturation adjustment parameter.

5. The method according to claim 2, which comprises:
acquiring a saturation adjusting gain $\alpha$;

determining a saturation level $S(\alpha \cdot \vec{C}_T)$ of a quantity obtained by multiplying the saturation adjusting gain $\alpha$ by the color tone vector $\vec{C}_T$; and if the saturation level $S(\alpha \cdot \vec{C}_T)$ is greater than a predetermined limit value L, then:

obtaining a saturation limiting parameter $\beta$ by dividing the predetermined limit value L by the saturation level $S(\alpha \cdot \vec{C}_T)$, and obtaining the saturation adjustment parameter by multiplying the saturation adjusting gain $\alpha$ by the saturation limiting parameter $\beta$.

6. The method according to claim 5, which comprises:

if the saturation level $S(\alpha \cdot \vec{C}_T)$ is not greater than the predetermined limit value L, then:

setting the saturation limiting parameter $\beta$ equal to one, and
obtaining the saturation adjustment parameter by multiplying the saturation adjusting gain $\alpha$ by the saturation limiting parameter $\beta$.

7. The method according to claim 5, which comprises:

if the saturation level $S(\alpha \cdot \vec{C}_T)$ is not greater than the predetermined limit value L, then using the saturation adjusting gain $\alpha$ as the saturation adjustment parameter.

8. The method according to claim 2, which comprises:
acquiring a saturation adjusting gain $\alpha$;

determining a saturation level $S(\vec{C}_T)$ of the color tone vector $\vec{C}_T$;

if the saturation level $S(\vec{C}_T)$ of the color tone vector $\vec{C}_T$ is not greater than a predetermined limit value L divided by the saturation adjusting gain $\alpha$, then using the saturation adjusting gain $\alpha$ as the saturation adjustment parameter; and if the saturation level $S(\vec{C}_T)$ is greater than the predetermined limit value L divided by the saturation adjusting gain $\alpha$, then setting the saturation adjustment parameter equal to a value obtained by dividing the predetermined limit value L by the saturation level $S(\vec{C}_T)$ of the color tone vector $\vec{C}_T$.

9. The method according to claim 2, which comprises:
acquiring a saturation adjusting gain $\alpha$; and if the saturation adjusting gain $\alpha$ is not less than zero and not greater than one, then using the saturation adjusting gain $\alpha$ as the saturation adjustment parameter that is multiplied by the color tone $\vec{C}_T$ to thereby set a saturation level of the saturation adjusted color tone vector $C_T^O$.

10. The method according to claim 9, which comprises:

selecting a mathematical function that is a monotonically decreasing function with respect to an argument as the argument varies between zero and a predetermined limit value L;

ensuring that when the mathematical function is evaluated using an argument that equals zero, the mathematical function equals the saturation adjusting gain $\alpha$;

ensuring that when the mathematical function is evaluated at values of the argument being not less than the predetermined limit value L, the mathematical function equals one; and if the saturation adjusting gain $\alpha$ is greater than one, then:

determining a saturation level $S(\vec{C}_T)$ of the color tone vector $\vec{C}_T$, using the saturation level $S(\vec{C}_T)$ of the color tone vector $\vec{C}_T$ as the argument and evaluating the mathematical function to obtain a value of the mathematical function, and using the value of the mathematical function as the saturation adjustment parameter that is multiplied by the color tone vector $\vec{C}_T$ to thereby set the saturation level of the saturation adjusted color tone vector $C_T^O$.

11. The method according to claim 9, which comprises:

determining a saturation level $S(\vec{C}_T)$ of the color tone vector $\vec{C}_T$; and if the saturation level $S(\vec{C}_T)$ of the color tone vector $\vec{C}_T$ is not less than a predetermined limit L and if the saturation adjusting gain $\alpha$ is greater than one, then:

setting the saturation adjustment parameter that is multiplied by the color tone vector $\vec{C}_T$ to a value of one to thereby set the saturation level of the saturation adjusted color tone vector $C_T^O$.

12. The method according to claim 9, which comprises:

selecting a mathematical function that is a monotonically decreasing function with respect to an argument as the argument varies between zero and a predetermined limit value L;

ensuring that when the mathematical function is evaluated using an argument that equals zero, the mathematical function equals the saturation adjusting gain α;

ensuring that when the mathematical function is evaluated at values of the argument being not less than the predetermined limit value L, the mathematical function equals one;

determining a saturation level $S(\vec{C}_T)$ of the color tone vector $\vec{C}_T$;

if the saturation level $S(\vec{C}_T)$ of the color tone vector $\vec{C}_T$ is not greater than the predetermined limit value L and if the saturation adjusting gain α is greater than one, then:

using the saturation level $S(\vec{C}_T)$ of the color tone vector $\vec{C}_T$ as the argument and evaluating the mathematical function to obtain a value of the mathematical function, selecting a minimum value from the group consisting of the value of the mathematical function, evaluated using the saturation level $S(\vec{C}_T)$ of the color tone vector $\vec{C}_T$, and a value obtained from dividing the predetermined limit value L by the saturation level $S(\vec{C}_T)$ of the color tone vector $\vec{C}_T$, and setting the saturation adjustment parameter that is multiplied by the color tone vector $\vec{C}_T$ to be equal to the minimum value such that the saturation level of the saturation adjusted color tone vector $C_T^O$ is thereby set; and if the saturation level $S(\vec{C}_T)$ of the color tone vector $\vec{C}C_T$ is greater than the predetermined limit value L and if the saturation adjusting gain α is greater than one, then:

setting the saturation adjustment parameter that is multiplied by the color tone vector $\vec{C}_T$ to be equal to one to thereby set the saturation level of the saturation adjusted color tone vector $C_T^O$.

13. A method for adjusting a color saturation level of at least one color pixel of an input image obtained from a time varying RGB video signal, comprising:

employing an RGB color processor for decomposing an RGB color sample representing the at least one color pixel into color tone information including a color tone vector having a direction representative of the hue of the color sample and a magnitude representative of the saturation of the color sample;

determining a saturation adjusted color tone based on the color tone vector and a saturation adjustment parameter; and determining a saturation adjusted RGB color sample based on the saturation adjusted color tone; wherein:

the step of decomposing an RGB color sample further includes the steps of:

obtaining an RGB color sample vector $\vec{C}$ representing the color pixel of the input image obtained from the time varying RGB video signal;

decomposing the RGB color sample vector $\vec{C}$ into a white vector $\vec{w}$ and a color tone vector $\vec{C}_T$;

the step of determining a saturation adjusted color tone further includes the steps of:

obtaining a saturation adjusted color tone vector $\vec{C}_T^O$ by multiplying the color tone vector $\vec{C}_T$ by the saturation adjustment parameter;

the steps of determining a saturation adjusted RGB color sample further includes the step of:

obtaining a saturation adjusted RGB color sample vector $\vec{C}_o$ by adding the white vector $\vec{w}$ and the saturation adjusted color tone vector $C_T^O$; and the method further comprising the steps of:

using the saturation adjusted RGB color sample vector $\vec{C}_o$ to represent a color pixel of an output image; and before performing the step of obtaining the saturation adjusted color tone vector $C_T^O$, determining a saturation level $S(\vec{C}_T)$ of the color tone vector $\vec{C}_T$, and choosing a value of the saturation adjustment parameter in dependence on the saturation level $S(\vec{C}_T)$ of the color tone vector $\vec{C}_T$ by estimating a magnitude of the color tone vector $\vec{C}_T$.

14. The method according to claim 13, which comprises:

representing the color tone vector $\vec{C}_T$ with components ($R_T$, $G_T$, $B_T$); and determining the saturation level $S(\vec{C}_T)$ of the color tone vector $\vec{C}_T$ using formula:

$$S(\vec{C}_T)=\sqrt{R_T^2+G_T^2+B_T^2}.$$

15. The method according to claim 13, which comprises:

representing the color tone vector $\vec{C}_T$ with components ($R_T$, $G_T$, $B_T$); and determining the saturation level $S(\vec{C}_T)$ of the color tone vector $\vec{C}_T$ using formula:

$$S(\vec{C}_T)=|R_T|+|G_T|+|B_T|.$$

16. The method according to claim 13, which comprises:

representing the color tone vector $\vec{C}_T$ with components ($R_T$, $G_T$, $B_T$); and determining the saturation level $S(\vec{C}_T)$ of the color tone vector $\vec{C}_T$ using formula:

$$S(\vec{C}_T)=\max(R_T^2, G_T^2, B_T^2).$$

17. The method according to claim 13, which comprises:

representing the color tone vector $\vec{C}_T$ with components ($R_T$, $G_T$, $B_T$); and determining the saturation level $S(\vec{C}_T)$ of the color tone vector $\vec{C}_T$ using formula:

$$S(\vec{C}_T)=\max(|R_T|,|G_T|,|B_T|).$$

18. The method according to claim 13, which comprises:

representing the color tone vector $\vec{C}_T$ with components ($R_T$, $G_T$, $B_T$); and determining the saturation level $S(\vec{C}_T)$ of the color tone vector $\vec{C}_T$ using formula:

$$S(\vec{C}_T) = \sqrt{(R_T^2 + G_T^2 + B_T^2) + (R_T - G_T)^2 + (G_T - B_T)^2 + (B_T - R_T)^2}.$$

19. The method according to claim 13, which comprises:
representing the color tone vector $\vec{C}_T$ with components $(R_T, G_T, B_T)$; and determining the saturation level $S(\vec{C}_T)$ of the color tone vector $\vec{C}_T$ using formula:

$$S(\vec{C}_T) = |R_T| + |G_T| + |B_T| + |R_T - G_T| + |G_T - B_T| + |B_T - R_T|.$$

20. The method according to claim 2, which comprises:
performing the step of decomposing the RGB color sample vector $\vec{C}_T$ by:

representing the RGB color sample vector $\vec{C}_T$ with components $(R, G, B)$;

calculating a luminance value Y from the RGB color sample vector $\vec{C}$, determining the white vector $\vec{w}$ according to equation:
$\vec{w} = (Y, Y, Y)$, and determining the color tone vector $\vec{C}_T$ according to equation:

$$\vec{C}_T = (R-Y, G-Y, B-Y).$$

21. The method according to claim 2, which comprises:
performing the step of decomposing the RGB color sample vector $\vec{C}$ by:

representing the RGB color sample vector $\vec{C}$ with components $(R, G, B)$;

determining the white vector $\vec{w}$ according to equation:

$$\vec{w} = (X, X, X), \text{ where } X = \frac{R+G+B}{3},$$

and determining the color tone vector $\vec{C}_T$ according to equation:

$$\vec{C}_T = (R-X, G-X, B-X).$$

22. The method according to claim 2, which comprises:
performing the step of decomposing the RGB color sample vector $\vec{C}$ by:

representing the RGB color sample vector $\vec{C}$ with components $(R, G, B)$;

determining the white vector $\vec{w}$ according to equation:

$$\vec{w} = (X, X, X), \text{ where } \vec{w} = \frac{G+B}{2}, \frac{R+B}{2}, \frac{R+G}{2},$$

and determining the color tone vector $\vec{C}_T$ according to equation:

$$\vec{C}_T = \left(R - \frac{G+B}{2}, G - \frac{R+B}{2}, B - \frac{R+G}{2}\right).$$

23. The method according to claim 2, which comprises:
defining a luminance vector $\vec{Y}$ where each component of the luminance vector $\vec{Y}$ is a luminance value obtained from the RGB color sample vector $\vec{C}$;

acquiring a color saturation adjusting gain $\alpha$;

obtaining a gray mixing ratio $\alpha_g$ by selecting a minimum value from the group consisting of one and the color saturation adjusting gain $\alpha$;

obtaining a gray level adjusted vector by multiplying the luminance vector $\vec{Y}$ by a quantity obtained by subtracting the gray mixing ratio $\alpha_g$ from one; and performing the step of obtaining the saturation adjusted RGB color sample vector $\vec{C}_o$ by:

before adding the white vector $\vec{w}$ and the saturation adjusted color tone vector $C_T^O$, multiplying the white vector $\vec{w}$ by the gray mixing ratio $\alpha_g$, and when adding the white vector $\vec{w}$, which has been multiplied by the gray mixing ratio $\alpha_g$, and the saturation adjusted color tone vector $C_T^O$, also adding thereto, the gray level adjusted vector to obtain the saturation adjusted RGB color sample vector $\vec{C}_o$.

* * * * *